United States Patent [19]

Mirtich et al.

[11] Patent Number: 5,390,363
[45] Date of Patent: Feb. 14, 1995

[54] TRANSMITTER AND RECEIVER CIRCUIT AND METHOD THEREFOR

[75] Inventors: Vincent L. Mirtich; John D. Hatchett, both of Scottsdale, Ariz.

[73] Assignee: Motorola, Inc., Schaumburg, Ill.

[21] Appl. No.: 54,479

[22] Filed: Apr. 30, 1993

[51] Int. Cl.[6] .............................................. H04B 1/44
[52] U.S. Cl. ......................................... 455/87; 455/75; 455/85
[58] Field of Search ...................... 455/84, 85, 86, 87, 455/75, 78, 79, 83

[56] References Cited

U.S. PATENT DOCUMENTS

| | | | |
|---|---|---|---|
| 4,246,539 | 1/1981 | Haruki et al. | 455/87 |
| 4,476,575 | 10/1984 | Franke et al. | 455/78 |
| 5,276,913 | 1/1994 | Lee et al. | 455/78 |

FOREIGN PATENT DOCUMENTS 2120906  12/1983  United Kingdom ................... 455/86

Primary Examiner—Edward F. Urban
Assistant Examiner—Mark D. Wisler
Attorney, Agent, or Firm—Gary Hoshizaki

[57] ABSTRACT

A circuit for alternately providing a first frequency to a receiver stage (20) and a second frequency to a transmitter stage (25) of a transmitter and receive circuit (11). The circuit comprises an oscillator (38), a first switch (33), a second switch (42), and a control circuit (29). The first switch (33) couples information to the oscillator (38) to be transposed on the second frequency during transmission. The second switch (42) couples the oscillator (38) to either the transmitter stage (25) or the receiver stage (20). Prior to changing oscillator frequency the control circuit (29) disables both outputs of the second switch (42). The control circuit (29) alternately tunes the oscillator (38) to the first frequency and enables the second switch (42) such that the oscillator (38) is coupled to the receiver stage (20) and tunes the oscillator (38) to the second frequency, enables the first switch (33), and enables the second switch (42) such that the oscillator (38) is coupled to the transmitter stage (25).

20 Claims, 3 Drawing Sheets

TRANSMITTER AND RECEIVER CIRCUIT AND METHOD THEREFOR

BACKGROUND OF THE INVENTION

This invention relates, in general, to transmitter and receiver circuits and more particularly to oscillator stages of the transmitter and receiver circuit.

Communication equipment such as cellular telephones have achieved wide spread availability due to increased levels of circuit integration and lower costs. The transmitter and receiver circuit of a communication device, send and receive data or information. It is well known by those skilled in the art that the transmitter circuit "transmits" either directly or via a carrier signal with data transposed thereon for reception by receiver circuits. The transmitter circuit generally outputs a signal of significant power to provide a signal over a wide spread area. Conversely, the receiver circuit is sensitive to a small amplitude signal. If the received signal is a carrier frequency of high frequency, it will be reduced by the receiver circuit to a lower frequency that is easily manipulated within an integrated circuit thereby allowing the information transposed on the signal to be retrieved.

Although transmitter and receiver circuits are different in function, both utilize similar oscillator frequencies. For example, a two stage receiver is tuned to receive a carrier signal of 915 megahertz (MHz). The input signal (915 MHz) is mixed with a first local oscillator signal having a frequency of 1055 MHz. The first stage mixer outputs a difference of the two frequencies (1055 MHz–915 MHz) resulting in a frequency of 140 MHz. A second stage mixer is used to further lower the frequency of the signal. The 140 MHz signal output by the first stage mixer is mixed with a 129.3 MHz signal from a second local oscillator, the difference of the two signals yielding a 10.7 MHz signal. The signal is reduced from 915 MHz to 10.7 MHz so that it is easily manipulated using circuitry formed on a standard integrated circuit process.

An example of a two stage transmitter circuit that would be paired with the previous receiver example outputs a 915 MHz signal for reception by other receiver circuits. Data to be sent is applied to an offset oscillator that outputs 140 MHz. The data or information is transposed on the 140 MHz signal. The 140 MHz signal output by the offset oscillator and the 1055 MHz signal from the first local oscillator (used in the receiver example) is applied to an offset mixer. The offset mixer outputs a difference signal (1055 MHz–140 MHz) of 915 MHz. The 915 MHz signal is then amplified and transmitted. The local oscillator supplying 1055 MHz is always enabled since it is used for both transmitting and receiving signals.

Although close in frequency, the second local oscillator of the receiver circuit outputs a 129.3 MHz signal while the offset oscillator of the transmitter circuit outputs a 140 MHz signal. Since the signal levels received by the receiver circuit are very small, output of the offset oscillator parasitically coupled to the receiver circuit desensitizes the receiver to the desired 140 MHz signal. To alleviate this problem the offset oscillator is removed as an interference source while receiving. A common method for removing the interference generated by the offset oscillator is to operate the offset oscillator at twice the frequency (280 MHz instead of 140 MHz in the example above) and divide the frequency by two using a flip flop. The output of the flip flop and hence the 140 MHz signal can be quickly disabled when the offset oscillator output is not needed. Power dissipation increases as a result of this technique but the interference source is quickly eliminated by moving it to a frequency outside the range of the signal being sensed.

There is a real need for reducing power consumption of a transmitter and receiver circuit for battery powered circuits. Low power translates to extended battery life which is a critical selling point for portable communication gear. Also, a reduction in components used to build the transmitter and receiver circuit would decrease integrated circuit size and reduce cost. It would be of great benefit if a transmitter and receiver circuit is provided having reduced complexity and lower power.

SUMMARY OF THE INVENTION

Briefly stated, this invention provides a circuit for providing a first frequency to a receiver stage and a second frequency to a transmitter stage and method therefor.

The circuit comprises an oscillator, a first switch, a second switch, and a control circuit.

The first switch includes a control input, an input and an output. The oscillator is frequency variable and includes an input coupled to the output of the first switch, a control input, and an output. The second switch includes a first control input, a second control input, an input coupled to the output of the oscillator, a first output coupled to the receiver stage, and a second output coupled to the transmitter stage.

The control circuit includes a first output, a second output, a third output, and fourth output. The first output of the control circuit couples to the control input of the first switch for enabling the first switch during transmission. The second output of the control circuit couples to the control input of the oscillator for changing oscillator frequency. The third and fourth output of the control circuit couples respectively to the first and second control input of the second switch for controlling the coupling of the oscillator to the receiver and transmitter stage through the second switch.

DETAILED DESCRIPTION OF THE DRAWINGS

Figure 1:
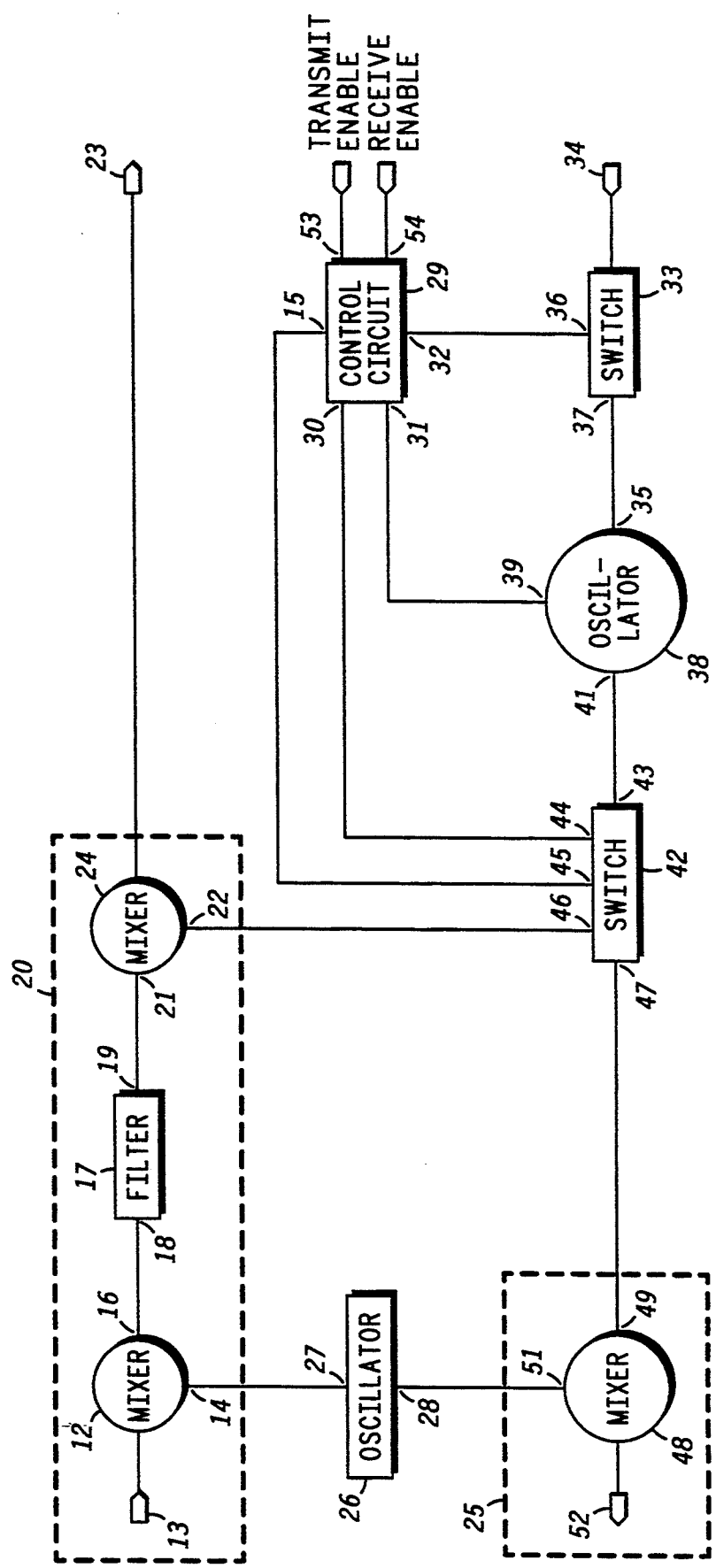
FIG. 1 is a block diagram of a transmitter and a receiver circuit in accordance with the present invention.

FIG. 1 is a block diagram of a transmitter and receiver circuit in accordance with the present invention.

Wireless two way communication frequently involves transmitting and receiving information on a single carrier frequency. A common method for transmitting and receiving is to alternately transmit and receive. For example, a transmit and receive cycle having a 50 percent duty cycle would transmit information half the time and receive information half the time. The entire transmit and receive cycle is typically under 100 milliseconds (ms) and depends on the architecture of the two way communication system.

Size, power, and cost dictates that a transmitter and a receiver circuit be integrated on a single integrated circuit as much as possible. Although different in function, the transmitter and receiver circuit utilize similar elements and operate at identical or similar frequencies. The close proximity of elements comprising the transmitter and receiver circuit creates interference problems due to radiated or coupled signals. The short cycle times (50 ms or less) of the transmit and receive cycle prevents techniques which disable elements of the transmitter and receiver circuit (such as an oscillator used for the transmitter circuit) to eliminate interference problems. It is well known by those skilled in the art that the transmitter and receiver circuit generally comprises more than one oscillator function, each oscillator operating at a different frequency. The multiple oscillator transmitter and receiver circuit will increase the expense, circuit complexity, and component count. Normally, separate oscillators are used for transmitter and receiver functions where frequencies utilized are close but not identical. The elimination of an oscillator and all its associated circuitry can be achieved by multiplexing one oscillator between the transmitter and receiver stages.

A transmitter and receiver circuit 11 is illustrated in FIG. 1. Transmitter and receiver circuit 11 comprises a transmitter stage 25 and a receiver stage 20. Transmitter stage 25 and receiver stage 20 are alternately enabled for transmitting and receiving data, respectively.

Receiver stage 20 comprises a mixer 12 and a mixer 24. Mixer 12 includes an input 13, an input 14 and an output 16. Mixer 24 includes an input 21, an input 22, and an output 23. Mixers are well known in the art for providing an output frequency that is the difference between the two input frequencies. Mixer 12 receives signals having higher frequencies than mixer 24. In the preferred embodiment, a filter 17 is coupled between mixer 12 and mixer 24 having band pass or low pass characteristics to filter out extraneous noise and unwanted mixer output signals. Filter 17 includes an input 18 coupled to output 16 of mixer 12 and an output 19 coupled to input 21 of mixer 24. Input 13 receives a signal carrying data or information. How the data is transposed on the signal is not pertinent to the present invention.

A transmitter stage 25 comprises a mixer 48. Mixer 48 has an input 49, an input 51 coupled to output 28 of oscillator 26, and an output 52. Mixer 48 performs a function opposite to that performed by mixer 12 although the method is identical. Mixer 48 receives a signal of a lower frequency at input 49 and outputs a signal of a higher frequency. For example, mixer 48 receives a 140 MHz signal at input 49 having transposed information to be transmitted. Oscillator 26 provides a 1055 MHz signal to input 51 of mixer 48. Mixer 48 outputs a signal of 915 MHz at output 52 which is the difference of the two input frequencies. The 915 MHz signal retains the original transposed information. It is well known that the signal provided at output 52 (915 MHz signal) is further filtered, amplified, and transmitted (not shown in FIG. 1) to be received by other communication devices. Note that oscillator 26 provides identical frequencies to both receiver stage 20 and transmitter stage 25 thereby allowing oscillator 26 to always be enabled.

Oscillator 26 provides a signal of a predetermined frequency to both transmitter stage 25 and receiver stage 20. Oscillator 26 has an output 27 coupled to input 14 of mixer 12 and an output 28 coupled to input 51 of mixer 48.

Mixer 12 outputs a signal having a frequency that is the difference of the frequencies received at inputs 13 and 14. For example, if a 915 megahertz (MHz) signal is received at input 13 and oscillator 26 provides a 1055 MHz signal, mixer 12 outputs a difference frequency of the two signals (at output 16) having a frequency of 140 MHz. Although lower in frequency, the signal output by mixer 12 still carries any data or information transposed on the original 915 MHz signal. Mixer 24 further reduces the frequency from 140 MHz but will be described in detail later in the specification.

Similar but not identical frequencies are supplied to input 49 of mixer 48 (transmitter stage 25) and input 22 of mixer 24 (receiver stage 20). Mentioned previously, mixer 24 further reduces the frequency of the signal received from mixer 12. This is accomplished by providing a signal of a predetermined frequency to input 22 to mixer 24. For example, the 140 MHz signal provided by mixer 12 is received at input 21 of mixer 24 as described above. A signal of 129.3 MHz is needed at input 22 of mixer 24 to produce a 10.7 MHz signal at output 23. The 10.7 MHz signal retains the transposed information to be received. This lower frequency provided by mixer 24 is much easier to manipulate with circuitry integrated on a semiconductor chip.

Stated previously, mixer 48 receives a 140 MHz signal (having information transposed thereon) at input 49 to be converted to a higher frequency for transmission. Note that the 140 MHz signal received by mixer 48 is close but not the same as the 129.3 MHz signal received by mixer 24. It is obvious to generate the 140 MHz signal and the 129.3 MHz signal using separate oscillators and other peripheral circuitry. The separate oscillator circuits create problems by generating interference that is coupled to the receiving circuit thereby reducing sensitivity and increasing cost due to added components and circuit complexity.

A solution that eliminates the interference problem and decreases circuit complexity is to use a single adjustable oscillator to supply both frequencies. This can be accomplished because receiver stage 20 and transmitter stage 25 are alternately enabled (they are not on simultaneously). In the preferred embodiment, receiver stage 20 and transmitter stage 25 are continuously alternately enabled with a fixed duty cycle which is a transmitting and receiving method well known in the art. An adjustable oscillator circuit 38 provides the appropriate frequency to both mixer 24 and mixer 48. Oscillator circuit 38 has a control input 39, an input 35, and an output 41. In the preferred embodiment, oscillator 38 is a voltage controlled oscillator well known in the art.

In the preferred embodiment, transmitter and receiver circuit 11 has equal transmit and receive cycles. Thus, oscillator 38 is coupled to mixer 24 approximately 50% of the time and to mixer 48 approximately 50% of the time. A switch 42 is used to couple output 41 of oscillator 38 to receiver stage 20 and transmitter stage 25. Switch 42 includes an input 43 coupled to oscillator output 41, a control input 44, a control input 45, an output 46 coupled to input 22 of mixer 24, and an output 47 coupled to input 49 of mixer 48. In the preferred embodiment, control inputs 44 and 45 provide control over outputs 46 and 47 such that both can be disabled and individually enabled. Switch 42 is compatible with the frequencies used. For example, high frequency signals may require a gallium arsenide switch such as part XRFIC2003 manufactured by Motorola Inc. The XRFIC2003 has an input and two outputs like switch 42 and has two control inputs for toggling between the two outputs, but does not allow both outputs to be disabled together. Although toggling between the two outputs may be functional to this circuit, it may let unwanted frequencies bleed through to transmitter stage 25 or receiver stage 20, so other corrective circuity should be incorporated to disable the outputs until oscillator 38 is stabilized.

In the preferred embodiment, information to be transmitted is coupled to oscillator 38 via a switch 33. Switch 33 includes an input 34, a control input 36, and an output 37 coupled to input 35 of oscillator 38. Information received at input 35 is transposed on a signal output by oscillator 38.

A control circuit 29 controls oscillator 38, switch 42, and switch 33. Control circuit 29 includes a transmit enable input 53, a receive enable input 54, an output 15 coupled to control input 45 of switch 42, an output 30 coupled to control input 44 of switch 42, an output 31 coupled to control input 39 of oscillator 38, and an output 32 coupled to control input 36 of switch 33.

The operation and interaction of control circuit 29 with oscillator 38 and switches 33 and 42 is best illustrated by example. Equal 20 millisecond transmit and receive cycles transmit information for 20 ms and receive information for 20 ms. Using the frequencies previously stated, oscillator 38 alternately provides the 129.3 MHz signal for receiver stage 20 and the 140 MHz signal for transmitter stage 25. The sequence of events coupling oscillator 38 via switch 42 to mixer 24 and mixer 48 is controlled by control circuit 29. In the preferred embodiment outputs 46 and 47 of switch 42 are disabled by outputs 30 and 15 of control circuit 29 prior to changing the frequency of oscillator 38. Disabling outputs 46 and 47 prevents an undesired frequency from being transmitted or received.

A transmit cycle is defined by an enabling signal received at transmit enable input 53. Oscillator 38 receives a signal at input 39 from control circuit 29 to change frequency. Using the example numbers, control circuit 29 adjusts oscillator 38 from 129.3 MHz to 140 MHz. Switch 33 is enabled by control circuit 29 via output 32 to provide data to be transmitted to oscillator 38. Output 15 of control circuit 29 in conjunction with output 30 enables output 47 of switch 42 after oscillator 38 has stabilized to 140 MHz. Delaying enablement of output 47 is critical to insure oscillator 38 is at 140 MHz before transmission begins. After the 20 ms predetermined time (transmission has been completed) outputs 46 and 47 of switch 42 are disabled prior to placing transmitter and receiver circuit 11 in a receive mode. Switch 33 is also disabled at this time.

A receive cycle is defined by an enabling signal received at receive enable input 54. The receive cycle is similar in some respects to the transmit cycle. However, since transmitter and receiver circuit 11 reverted to the receive mode at the end of the transmit cycle, oscillator 38 has already received a signal at input 39 from control circuit 29 to change frequency. From the example, control circuit 29 is already adjusting oscillator 38 from 140 MHz to 129.3 MHz via output 31 when receive enable input 54 receives an enabling signal. Output 30 of control circuit 29 in conjunction with output 15 enables output 46 of switch 42 after oscillator 38 has stabilized to 129.3 MHz. A signal at input 13 may now be received. After the 20 ms predetermined time (receiving has been completed) outputs 46 and 47 of switch 42 are again disabled to start placing transmitter and receiver circuit 11 in a transmit mode. The transmit and receive cycles are continuously repeated as long as transmitter and receiver circuit 11 is enabled.

Figure 2:
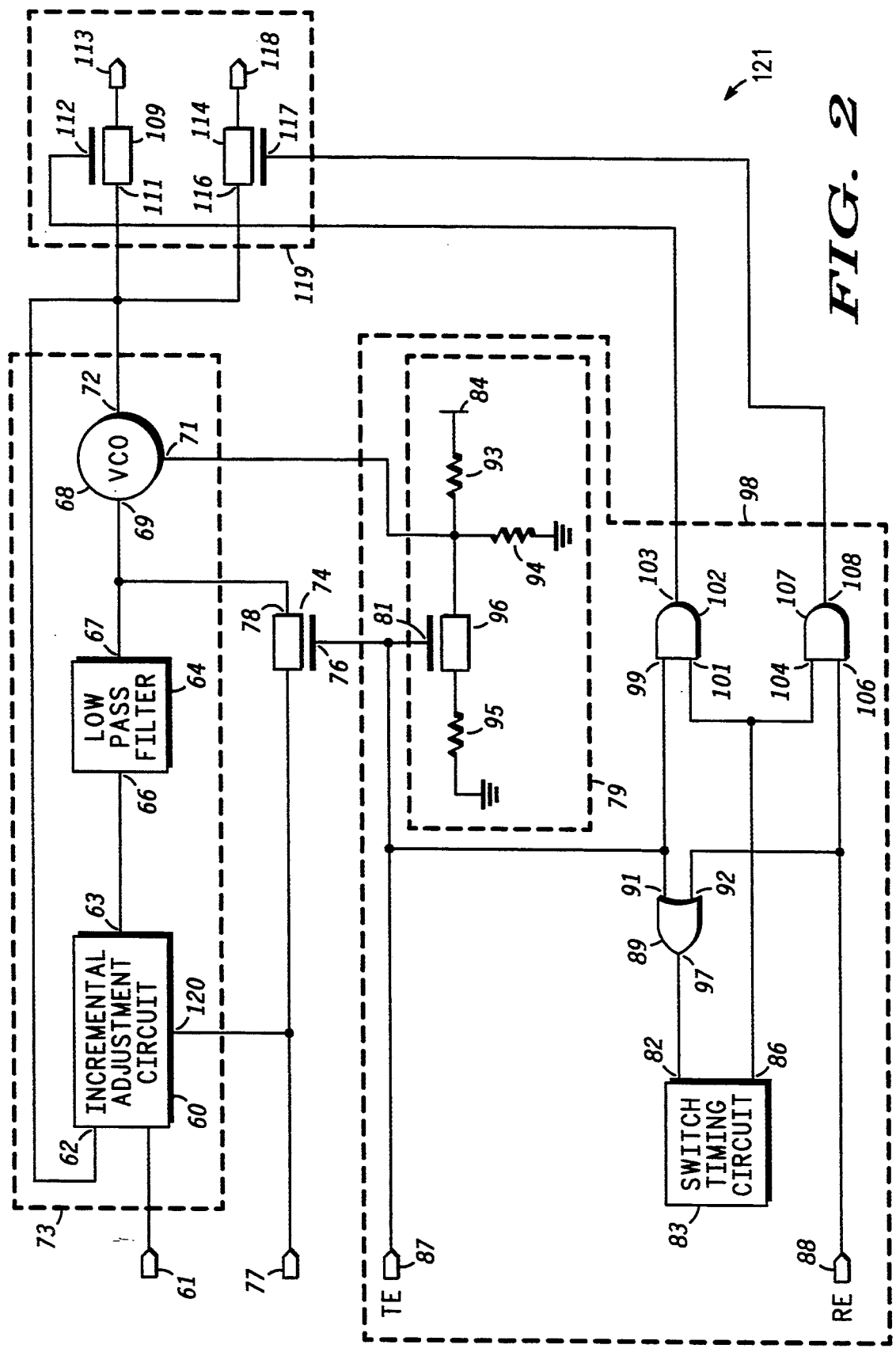
FIG. 2 is a preferred embodiment of an oscillator stage providing switched outputs in accordance with the present invention.
Figure 3:
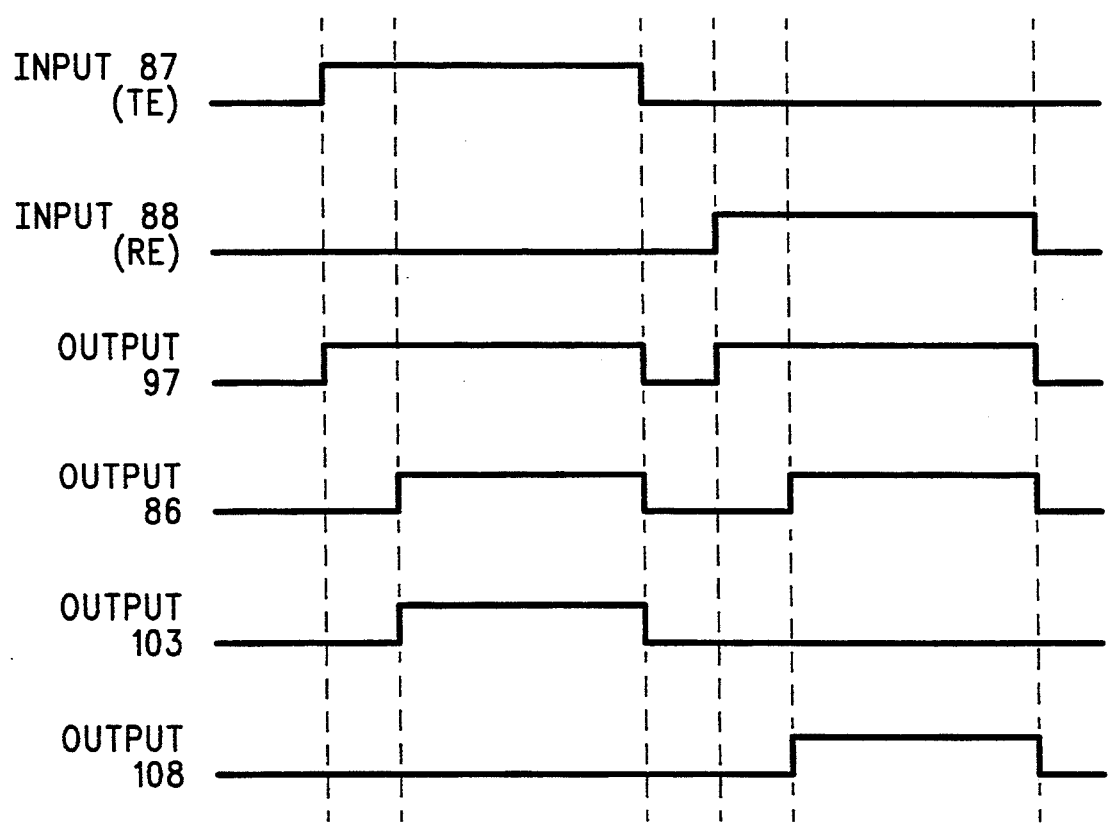
FIG. 3 is a timing diagram corresponding to the oscillator stage of FIG. 2.

FIG. 2 is the preferred embodiment of an oscillator stage 121 providing switched outputs in accordance with the present invention. FIG. 3 is a timing diagram useful for describing the operation of oscillator stage 121 of FIG. 2. FIG. 2 corresponds to switch 33, oscillator 38, switch 42, and control circuit 29 of FIG. 1.

A voltage controlled oscillator (VCO) 68 provides at least two signals of different frequencies. VCO 68 includes a control input 69, a control input 71, and an output 72. In the preferred embodiment, an incremental adjustment circuit 60 incrementally increases or decreases the frequency output by VCO 68. Incremental adjustment circuit 60 includes an input 61 for receiving a reference frequency, an input 62 coupled to output 72 of VCO 68 providing feedback for sensing the frequency output by VCO 68, a control input 120 coupled to a transmit enable input 87 (TE) for allowing course frequency adjustments to be made to VCO 68, and an output 63. A low pass filter 64 filters out high frequency components produced by incremental adjustment circuit 60 thereby providing a stable control signal to VCO 68. Low pass filter 64 includes an input 66 coupled to output 63 of incremental adjustment circuit 60 and an output 67 coupled to control input 69 of VCO 68. The signal frequency at output 72 corresponds to voltage magnitudes at input 69 and 71 of VCO 68. A phase lock loop is formed by incremental adjustment circuit 60, low pass filter 64, and VCO 68, that produces a stable signal having minimal frequency variations. Changing the voltage at input 71 of VCO 68 causes a change in frequency at output 72. A phase lock loop having a similar architecture to that described above can be constructed using phase lock loop IC MC145151 manufactured by Motorola Inc. Phase lock loops having different architecture's could also be used with varying results.

It is essential for VCO 68 to stabilize quickly when a change in frequency is needed. Transmitting and receiving information in alternating short intervals, e.g. 20 ms (as described in FIG. 1) would be extremely difficult if stabilization of VCO 68 took a significant portion of the 20 ms interval. In the preferred embodiment, VCO 68 provides a first and a second frequency at output 72 at different times. The speed to stabilize to a new frequency decreases significantly by adding an error voltage or difference voltage to VCO 68 to generate the new frequency. The error voltage is coupled to input 71 thereby changing the frequency of VCO 68. An error voltage circuit 79 provides the error voltage to control input 71 of VCO 68. Error voltage circuit 79 outputs a first and a second error voltage corresponding respectively to the first and second frequency generated by VCO 68. For example, the first error voltage is output by error voltage circuit 79 when the first frequency is to be produced by VCO 68. Likewise, the second error voltage is output by error voltage circuit 79 when the second frequency is to be produced by VCO 68. Once an error voltage is input to VCO 68 and the incremental adjustment circuit 60 is programmed by control input 120 for the new frequency of VCO 68, phase lock loop 73 responds to the change in frequency and stabilizes VCO 68 at the corresponding new frequency. Very little voltage correction is needed by phase lock loop 73 because of the error voltage input generated by error voltage circuit 79 thereby minimizing the time needed for frequency stabilization.

In the preferred embodiment, error voltage circuit 79 is a resistor divider network that is switchable to provide the first and second error voltages. Error voltage circuit 79 comprises a resistor 93, a resistor 94, a transmission gate 96, and a resistor 95. Resistor 93 and 94 form a resistor divider. Resistor 93 is coupled between input 71 of VCO 68 and a terminal of a power supply 84. Resistor 94 is coupled between input 71 and ground. Transmission gate 96 has a first terminal, a second terminal, and a control terminal 81. The first terminal of transmission gate 96 is coupled to input 71 and control terminal 81 is coupled to input 87 (TE-transmit enable). Resistor 95 is coupled between the second terminal of transmission gate 96 and ground. The common connections of resistor 93, resistor 94, and transmission gate 96 to input 71 correspond to output 31 of control circuit 29 in FIG. 1. The first error voltage is generated when transmission gate 96 is disabled. The second error voltage is generated when transmission gate 96 is enabled placing resistor 95 in parallel with resistor 94. It would be obvious to one skilled in the art that other means for generating an error voltage for input 71 of VCO 68 exist. For example, the error voltage change during transmit can be reversed by returning resistor 95 to the terminal of power supply 84 rather than ground.

In the preferred embodiment, a transmission gate 74 is used to couple a signal from input 77 to input 69 of VCO 68. Transmission gate 74 corresponds to switch 33 of FIG. 1. In general, transmission gate 74 couples information to be transposed on the signal output by VCO 68 for transmission. This information is usually of a low frequency. Transmission gate 74 includes an input 77, a control input 76, and an output 78. Control input 76 is coupled to input 87 (TE). Output 78 is coupled to input 69 of VCO 68. It should be obvious to one skilled in the art that variations on this theme can also be used; such as inserting a short time delay between input 87 and control input 76 of transmission gate 74 or using a summing amp to sum output 78 of transmission gate 74 with output 67 of low pass filter 64.

A switch 119 corresponds to switch 42 of FIG. 1. Switch 119 comprises a transmission gate 109 and a transmission gate 114. Transmission gate 109 includes an input 111 coupled to output 72 of VCO 68, a control input 112, and an output 113. Transmission gate 114 includes an input 116 coupled to output 72 of VCO 68, a control input 117, and an output 118. It must be reiterated that transmission gates 109 and 114 must be of a type that can pass high frequency signals generated by VCO 68. Switch 119 allows multiplexing of output 72 of VCO 68.

A switch control circuit 98 comprises an OR gate 89, a switch timing circuit 83, an AND gate 102, an AND gate 107, and an error voltage circuit 79. OR gate 89 includes an input 91 coupled to input 87 (TE), an input 92 coupled to input 88 (RE-receive enable), and an output 97. Switch timing circuit 83 provides a delayed signal for enabling transmission gate 109 or transmission gate 114. Delay circuits are well known in the art. Switch timing circuit 83 includes an input 82 coupled to output 97 of OR gate 89 and an output 86. AND gate 102 includes an input 99 coupled to input 87 (TE), an input 101 coupled to output 86 of switch timing circuit 83, and an output 103 coupled to control input 112 of transmission gate 109. AND gate 107 includes an input 104 coupled to output 86 of switch timing circuit 83, an input 106 coupled to input 88 (RE), and an output 108 coupled to control input 117 of transmission gate 114. Outputs 103 and 108 correspond to outputs 15 and 30 respectively of control circuit 32 (FIG. 1).

Operation of the circuit is best described using the timing diagram on FIG. 3. Events will be described in sequence with the timing diagram. Inputs 61 and 120 of phase lock loop 73 receive a reference signal and programming input respectively to set the frequency of VCO 68, the reference signal is constant throughout the circuit operation. Initially, input 87 and input 88 (shown in FIG. 3) are both in a zero logic state. This produces a zero logic state at both output 103 and output 108 (shown in FIG. 3). Transmission gates 109 and 114 are both disabled under this condition.

Input 87 (TE) changes from a zero logic state to a one logic state enabling transmission gate 74 and transmission gate 96 and coursely programming incremental adjustment circuit 60. Transmission gate 74 provides a signal path from input 77 to input 69 of VCO 68 for data to be transposed and transmitted. Transmission gate 96 parallels resistor 95 with resistor 94 producing the second error voltage from error voltage circuit 79. The second error voltage is received at input 71 of VCO 68 producing the second frequency at output 72. Output 97 of OR gate 89 changes from a zero logic state to a one logic state enabling switch timing circuit 83 to provide a delayed one logic level a predetermined time after the input one logic state is received to AND gates 102 and 107. The predetermined time is chosen to allow VCO 68 to stabilize to the second frequency or the first frequency. Output 86 at a one logic state changes output 103 (FIG. 3) of AND gate 102 from a zero logic state to a one logic state. The one logic state at output 103 enables transmission gate 109 coupling output 72 to output 113.

Input 87 returns to a zero logic state (input 88 is also in the zero logic state) both transmission gates 109 and 114 are disabled. Transmission gate 74 and 96 are disabled at this time and incremental adjustment circuit 60 is programmed back to its previous value. VCO 68 transitions to the first frequency.

Input 88 (RE) changes from a zero logic state to a one logic state. Transmission gate 96 remains disabled and the first error voltage generated by error voltage circuit 79 is maintained at input 71 of VCO 68. Switch timing circuit 83 is enabled by OR gate 89. Switch timing circuit 83 provides a one logic state the predetermined time after being enabled. VCO 68 has stabilized to the first frequency when output 86 goes to the one logic state. Output 108 of AND gate 107 transitions to a one logic state enabling transmission gate 114. Enabled transmission gate 114 couples output 72 of VCO 68 to output 118.

Input 88 returns to a zero logic state and both transmission gate 109 and 114 are disabled. Only one cycle for toggling switch 119 is illustrated in FIG. 3 but it should be obvious that the cycle could be repeated as long as needed.

By now it should be appreciated that a transmitter and receiver circuit has been provided that reduces interference and component count. The transmitter and receiver circuit 11 utilizes a single oscillator stage to alternately provide a signal of a first frequency to a receiver stage 20 and a signal of a second frequency to a transmitter stage 25.

We claim:

1. A transmitter and receiver circuit comprising:
   a first mixer including a first input, a second input and an output;
   a first oscillator including a first output coupled to said second input of said first mixer and a second output;
   a second mixer including a first input coupled to said output of said first mixer, a second input, and an output;
   a first switch including an input, a control input, and an output;
   a second oscillator including an input coupled to said output of said first switch, a control input, and an output;
   a second switch including an input coupled to said output of said second oscillator, a first control input, a second control input, a first output coupled to said second input of said second mixer, and a second output;
   a third mixer including a first input coupled to said second output of said second switch, a second input coupled to said second output of said first oscillator, and an output; and
   a control circuit including a transmit enable input, a receive enable input, a first output coupled to said control input of said first switch, a second output coupled to said control input of said second oscillator, a third output coupled to said first control input of said second switch, and a fourth output coupled to said second control input of said second switch, whereby said control circuit enables and disables said first or second switch for transmitting or receiving a signal.

2. A transmitter and receiver circuit as recited in claim 1 wherein said second oscillator is a voltage controlled oscillator.

3. A transmitter and receiver circuit as recited in claim 2 further including
   an incremental adjustment circuit having a first input for receiving a reference signal, a feedback input coupled to said output of said second oscillator, and an output; and
   a low pass filter having an input coupled to said output of said incremental adjustment circuit and an output coupled to said input of said second oscillator, said incremental adjustment circuit, said low pass filter, and said second oscillator forming a phase lock loop.

4. A transmitter and receiver circuit as recited in claim 3 wherein said control circuit includes an error voltage circuit for providing a first or second error voltage having an input coupled to said transmit enable input and an output coupled to said second output of said control circuit.

5. A transmitter and receiver circuit as recited in claim 4 wherein said error voltage circuit comprises
   a first resistor coupled between a terminal of a power supply and said second output of said control circuit;
   a second resistor coupled between said second output of said control circuit and ground;
   a transmission gate including a control input coupled to said transmit enable input of said control circuit, a first terminal coupled to said second output of said control circuit, and a second terminal; and
   a third resistor coupled between said second terminal of said transmission gate and ground.

6. A transmitter and receiver circuit as recited in claim 5 wherein said first switch comprises a transmission gate including a control input coupled to said transmit enable input, a first terminal coupled to said input of said first switch, and a second terminal coupled to said output of said first switch.

7. A transmitter and receiver circuit as recited in claim 6 wherein said control circuit further includes
   an OR gate having a first input coupled to said transmit enable input, a second input coupled to said receive enable input of said control circuit, and an output;
   a switch timing circuit including an input coupled to said output of said OR gate and an output;
   a first AND gate having a first input coupled to said receive enable input, a second input coupled to said output of said switch timing circuit, and an output coupled to said third output of said control circuit; and
   a second AND gate having a first input coupled to said transmit enable input, a second input coupled to said output of said switch timing circuit, and an output coupled to said fourth output of said control circuit.

8. A transmitter and receiver circuit as recited in claim 7 wherein said second switch comprises
   a first transmission gate including a control input corresponding to said first control input of said second switch, a first terminal coupled to said input of said second switch, and a second terminal corresponding to said first output; and
   a second transmission gate including a control input corresponding to said second control input of said second switch, a first terminal coupled to said input of said second switch, and a second terminal corresponding to said second output.

9. A transmitter and receiver circuit as recited in claim 8 wherein said first and second outputs of said second switch are disabled until said second oscillator has stabilized.

10. A transmitter and receiver circuit as recited in claim 9 further including a filter coupled between said output of said first mixer and said input of said second mixer.

11. A transmitter and receiver circuit as recited in claim 10 wherein said second mixer and said third mixer alternately couple to said second oscillator and wherein said second mixer and said third mixer receive signals having different frequencies.

12. A method for alternately providing a first frequency to a receiver stage and a second frequency to a transmitter stage, the method comprising:
   providing a voltage controlled oscillator, said voltage controlled oscillator being variable in frequency;
   decoupling said voltage controlled oscillator from the receiver stage and the transmitter stage;
   adjusting said voltage controlled oscillator to the first frequency;
   stabilizing to the first frequency;
   coupling said voltage controlled oscillator to the receiver stage;
   decoupling said voltage controlled oscillator from the receiver stage;
   adjusting said voltage controlled oscillator to the second frequency;
   stabilizing to the second frequency;
   coupling said voltage controlled oscillator to the transmitter stage;

transposing information on the second frequency; and
decoupling said voltage controlled oscillator from said transmitter stage.

13. A method as recited in claim 12 wherein said coupling said voltage controlled oscillator to the receiver stage step includes
mixing the first frequency with a receive signal to shift said receive signal to a lower frequency.

14. A method as recited in claim 12 wherein said coupling said voltage controlled oscillator to the transmitter stage step includes
transposing information on the second frequency;
mixing the second frequency with a reference signal to shift said second frequency to a higher frequency.

15. A circuit for alternately providing a first frequency to a receiver stage and a second frequency to a transmitter stage, the circuit comprising:
an oscillator being frequency variable including a control input, an input, and an output;
a first switch for coupling a signal to said oscillator, said first switch including a control input for enabling and disabling said first switch, an input, and an output coupled to said input of said oscillator;
a second switch including an input coupled to said output of said oscillator, a first control input, a second control input, a first output coupled to the receiver stage, and a second output coupled to the transmitter stage, said second switch switchably couples said input of said second switch to either said first or second output;
a control circuit for controlling said first and second switch, said control circuit including a first output coupled to said control input of said first switch, a second output coupled to said control input of said oscillator, a third output coupled to said first control input of said second switch, and a fourth output coupled to said second control input of said second switch, whereby said first output of said control circuit enables said first switch during transmission, said second output of said control circuit changes said oscillator frequency, and said third and fourth outputs of said control circuit control said second switch.

16. A circuit as recited in claim 15 wherein said oscillator frequency locks to the first or second frequency and wherein said oscillator is a voltage controlled oscillator.

17. A circuit as recited in claim 15 wherein said first switch comprises a transmission gate having a control input, a first terminal, and a second terminal corresponding respectively to said control input, input, and output of said first switch.

18. A circuit as recited in claim 15 wherein said second switch comprises:
a first transmission gate having a control input, a first terminal, and a second terminal corresponding respectively to said first control input, input, and first output of said second switch; and
a second transmission gate having a control input, a first terminal and a second terminal corresponding respectively to said second control input, input, and second output of said second switch.

19. A circuit as recited in claim 15 further including an error voltage circuit for rapidly changing said oscillator frequency, said error voltage circuit comprising:
a first resistor coupled between a terminal of a power supply and said second output of said control circuit;
a second resistor coupled between said second output of said control circuit and ground;
a transmission gate having a control input coupled to a transmit enable input of said control circuit, a first terminal coupled to said second output of said control circuit, and a second terminal; and
a third resistor coupled between said second terminal of said transmission gate and ground.

20. A circuit as recited in claim 15 further including an OR gate including a first input coupled to a transmit enable input of said control circuit, a second input coupled to a receive enable input of said control circuit, and an output;
a switch timing circuit including an input coupled to said output of said OR gate and an output, whereby said switch timing circuit delays enablement of said second switch; said switch timing circuit delays enablement of said second switch;
a first AND gate including a first input coupled to said receive enable input, a second input coupled to said output of said switch timing circuit, and an output corresponding to said third output of said control circuit; and
a second AND gate including a first input coupled to said transmit enable input, a second input coupled to said output of said switch timing circuit, and an output corresponding to said fourth output of said control circuit.

* * * * *